July 18, 1961 — O. D. EGER — 2,992,721
METHODS AND SYSTEMS FOR HANDLING AND TRANSPORTING BLOCKS
Filed July 11, 1958 — 5 Sheets-Sheet 1
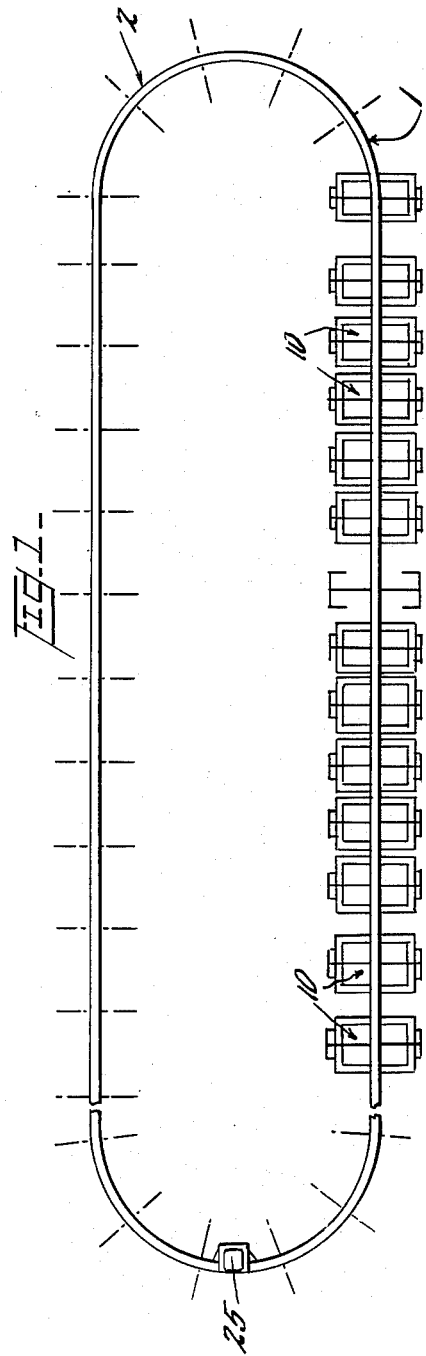
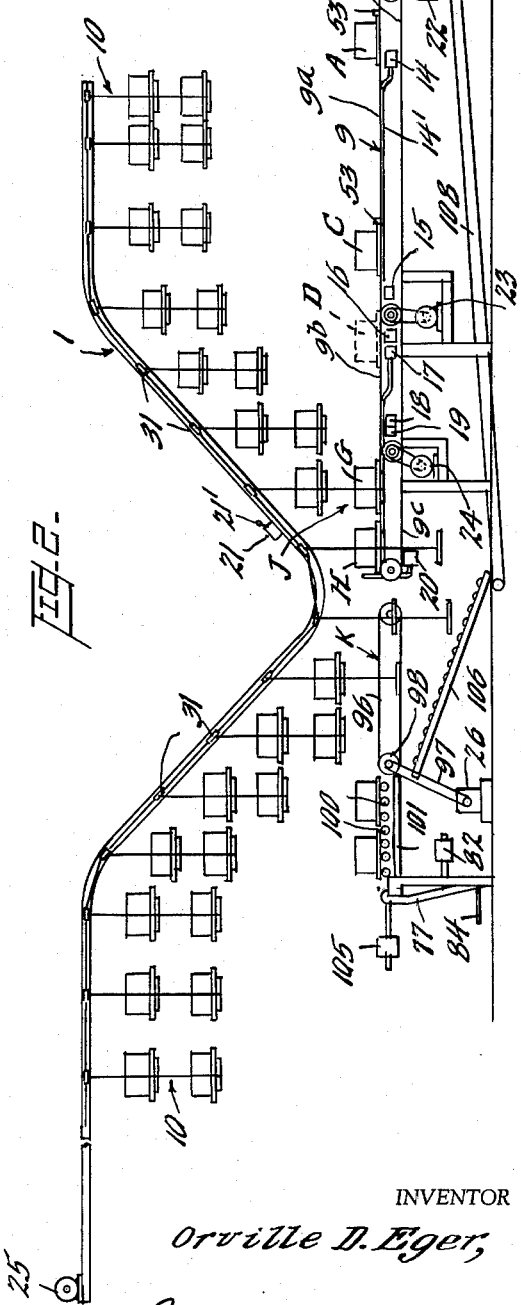
INVENTOR
Orville D. Eger,
BY Sommers & Young
ATTORNEYS

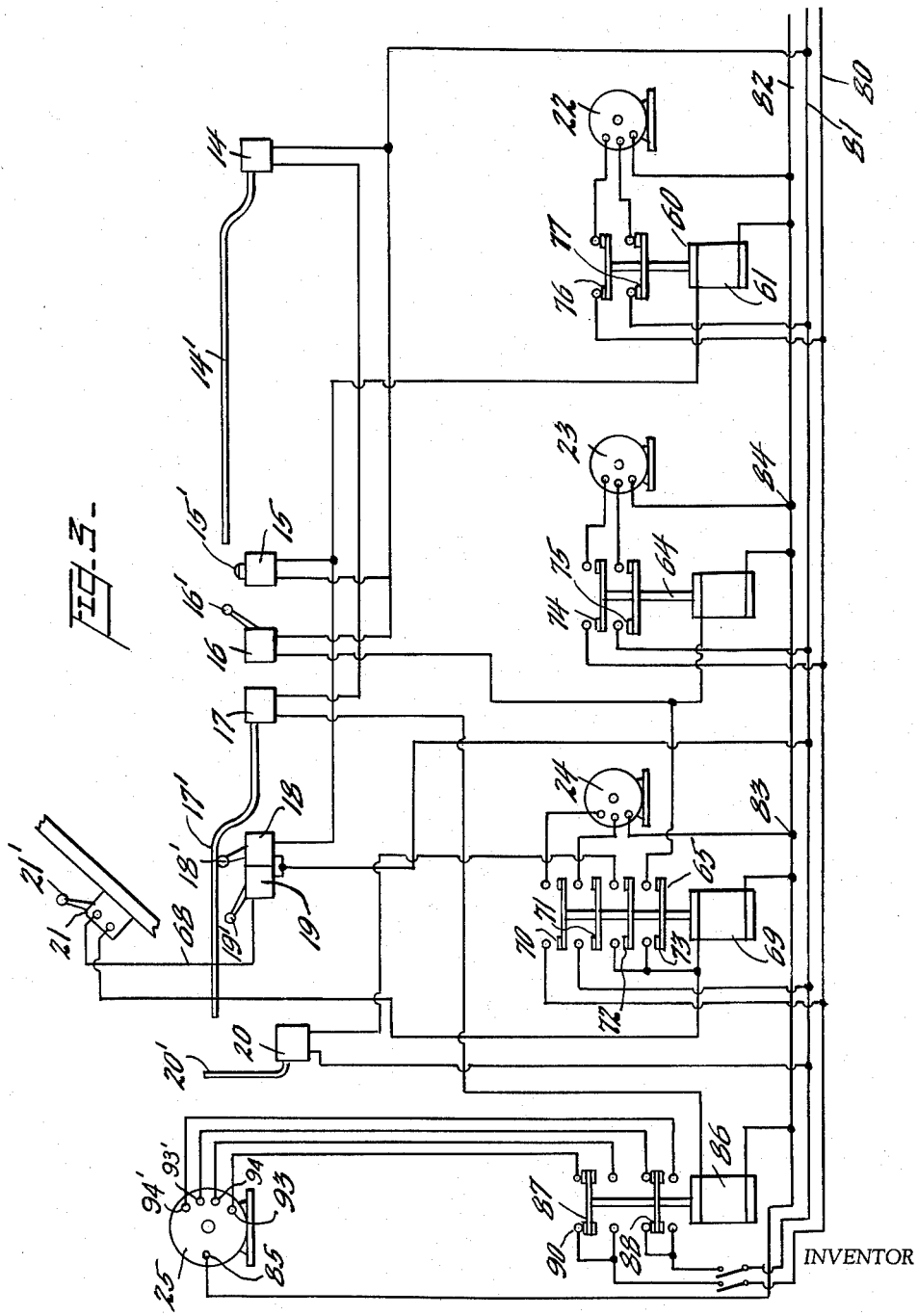

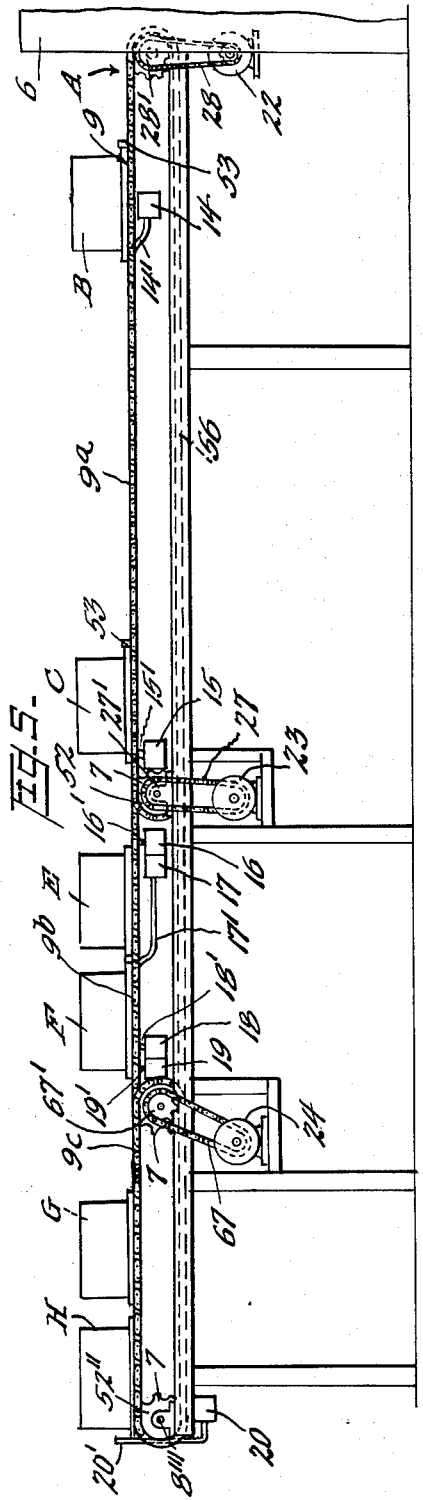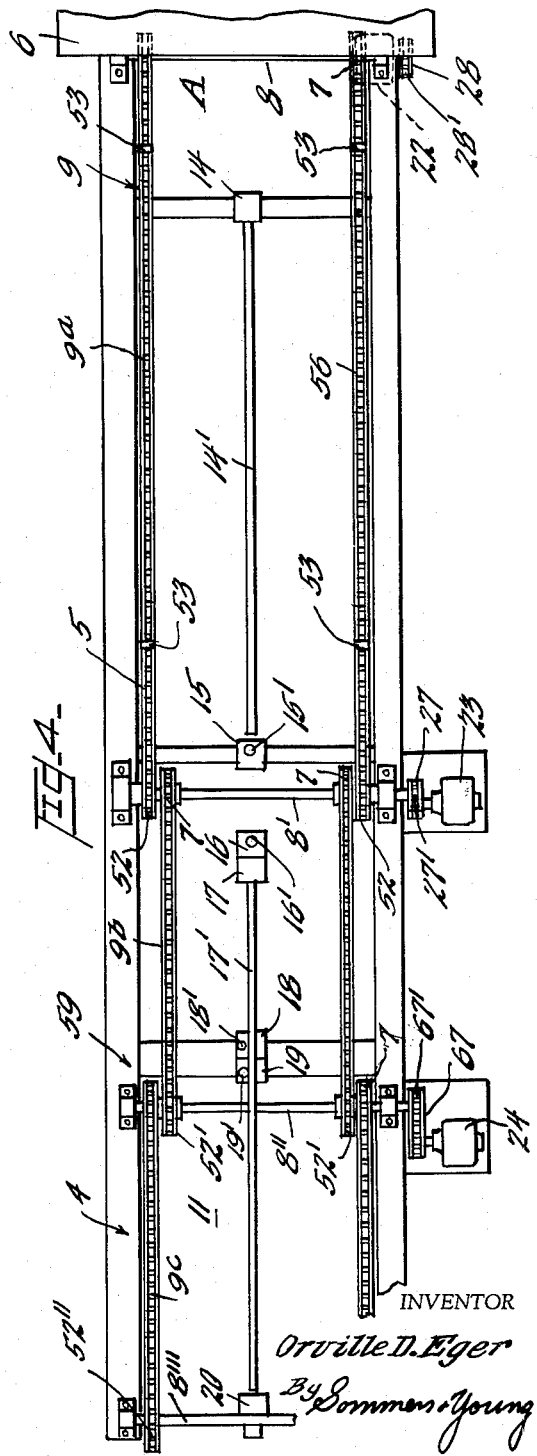

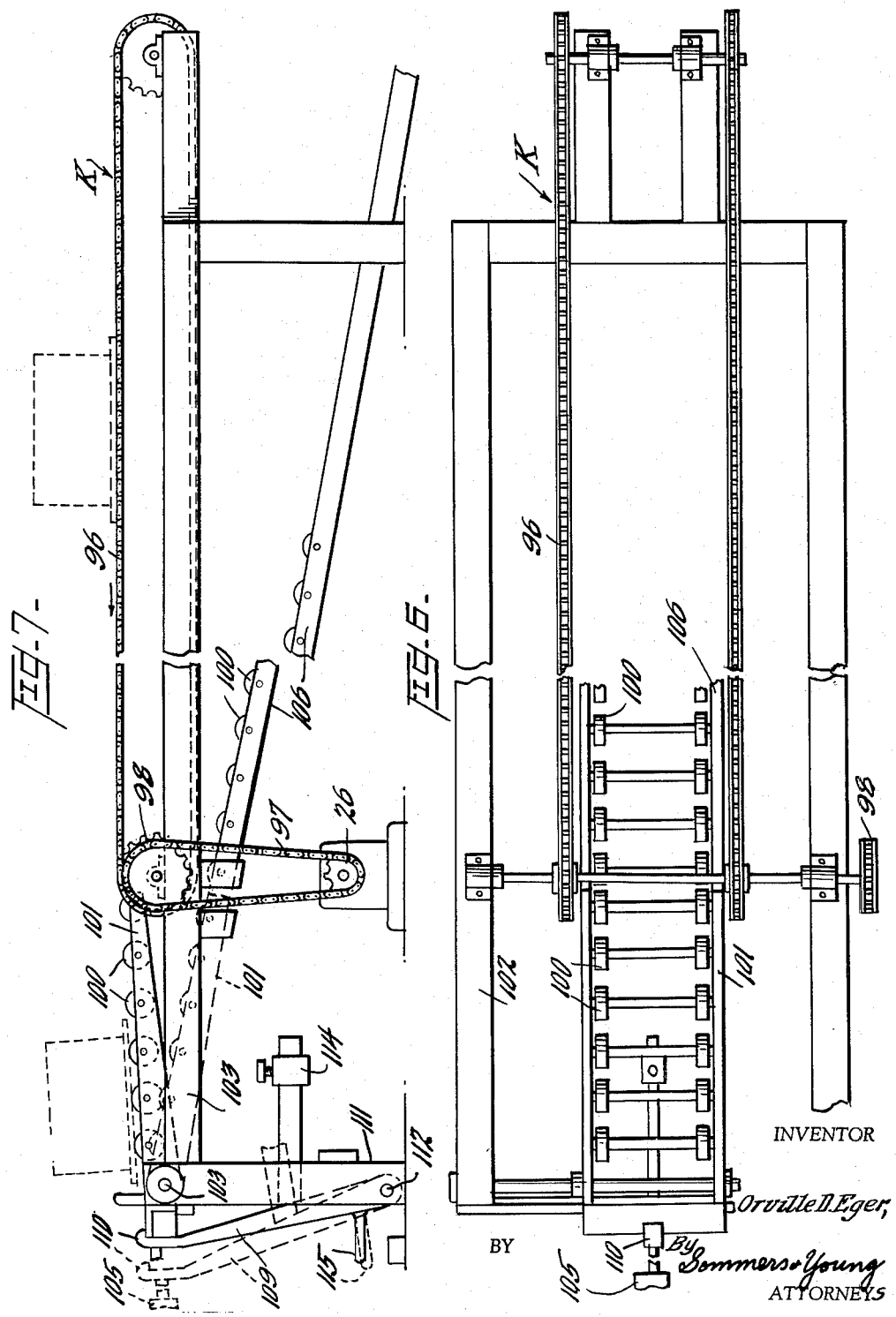

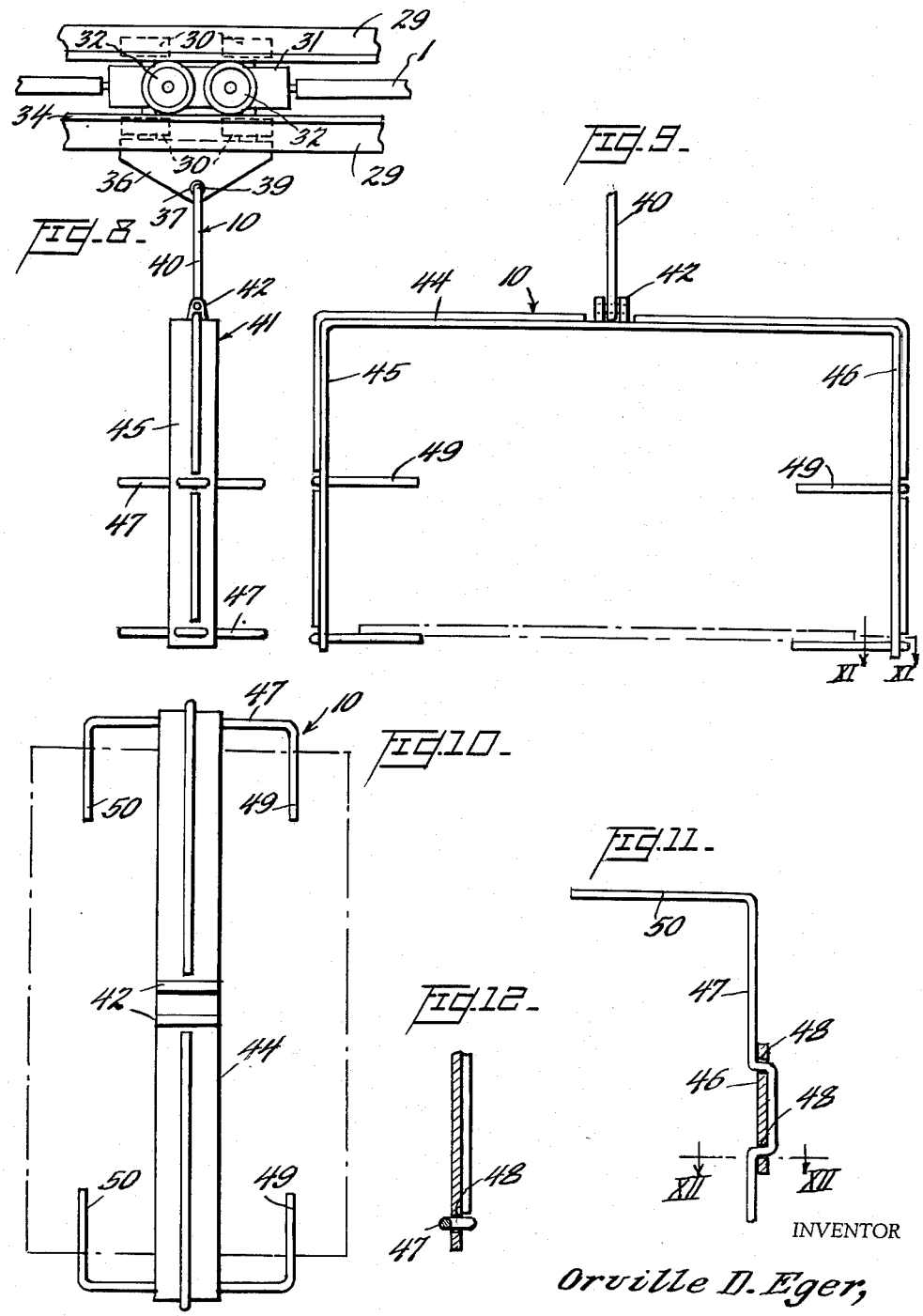

United States Patent Office 2,992,721
Patented July 18, 1961

2,992,721
METHODS AND SYSTEMS FOR HANDLING AND TRANSPORTING BLOCKS
Orville David Eger, Lakeland, Fla.
(P.O. Box 245, Auburndale, Fla.)
Filed July 11, 1958, Ser. No. 748,013
15 Claims. (Cl. 198—85)

This invention relates to methods and systems for handling and transporting blocks, particularly blocks of the type which are molded in machines having molds, and the pallets on which the molded blocks are carried upon emerging from the molding machine. Such blocks may be composed of various materials such as the ingredients of concrete, principally hydraulic cement and various fillers, such as sand and larger aggregate, or so-called cinder blocks which include principally hydraulic cement and cinders of various sorts. The present invention is not concerned with the contents of the blocks themselves, but only with the method and apparatus for the feeding and handling of the blocks and pallets during the curing of the blocks.

In modern machines for molding blocks of the kind under consideration automatic means is provided for varying the time the blocks are in the molds, depending on certain factors, such as the time of vibration and the time required for the stripper shoes to reach the point in the mold box giving the block the uniform height desired. So far as the present invention is concerned the important consideration is that the pallets bearing the freshly molded, uncured blocks, do not arrive at the curing apparatus at regular intervals but at non-uniform time intervals, and thus the invention is concerned with the feeding and transport of the blocks when so delivered.

An object of this invention is to provide an apparatus for handling and transporting molded blocks adapted to be controlled in speed and time of operation by the delivery of the blocks or pallets bearing the blocks to said handling apparatus.

A further object of this invention is to provide a transporting system which is so controlled by the delivery thereto of the objects to be treated as to maintain the objects in the zone of treatment the longest possible time by regulating the speed of movement of the transporting mechanism which carries the blocks through the treating zone.

Another object of this invention is to provide an electrical system for driving and controlling the block transporting system in such manner that the transporting system runs at either of two speeds, one a slow speed when no blocks are in position to be delivered to said transporting system, and at higher speed when blocks have been delivered into position to arrive at a delivery station and be received by said transporting apparatus.

Still another object of this invention is to provide a novel transport apparatus having a trolley system which travels along the treatment zone or zones and is provided with carriers which are adapted to pick up the pallets containing the blocks to be treated and to carry them through the treatment zone or zones and to deliver the blocks at a point of deposit.

In the accompanying drawing an embodiment of the invention is represented by way of example.

In the drawings:

FIGURE 1 is a plan view diagrammatically representing a trolley type transport system of closed circuit type having a loading and unloading position, and extending with its path through a zone or zones of treatment of the articles being handled;

FIGURE 2 is a partially diagrammatic, enlarged elevation of the loading and unloading stations of the transport mechanism and the cooperating loading and unloading mechanism.

FIGURE 3 is an electrical diagram of the drive mechanism and speed control of the main transporting trolley conveyor and the feeding conveyor system.

FIGURE 4 is a plan view on an enlarged scale of the conveyor system for feeding the main conveying system.

FIGURE 5 is a front elevation on an enlarged scale of the conveyor system for feeding and discharging the main trolley transport system;

FIGURE 6 is a diagrammatic plan view on an enlarged scale of the discharging mechanism of the main handling and transport system;

FIGURE 7 is a diagrammatic front elevation on an enlarged scale of the discharge mechanism of the handling and conveying system.

FIGURE 8 is an enlarged side elevational view of one of the block-carrying hangers illustrating the trolley mechanism and carriage from which it is suspended.

FIGURE 9 is an enlarged front view of a hanger with the trolley omitted.

FIGURE 10 is an enlarged bottom view of a hanger with a block-carrying pallet illustrated in broken lines XI—XI of FIG. 11, illustrating a detail of a hanger.

FIGURE 12 is an enlarged section on line XII—XII of FIG. 11.

In the drawings numeral 1 designates generally an endless trolley-type conveyor which extends through a closed path 2 from a hanger loading or pick-up position indicated generally by reference character J to a hanger unloading position indicated generally by reference character K.

Although the particular type or composition of the elements being treated are not critical or of importance in connection with the present invention, for the purposes of this illustration of the invention the articles being handled will be presumed to be concrete blocks composed of hydraulic cement and various other materials or aggregates. Accordingly the term block as used herein is intended to denote any article suitable for handling and treatment by the apparatus herein disclosed and claimed.

Numeral 6 designates a block-making machine which is represented diagrammatically since its details are of no importance in connection with the present invention. It is, however, characteristic of such block manufacturing machines that their output is not regular in point of the time required for forming each block, and that the blocks which issue from the machine, at a position represented generally by letter A, are ejected onto the first section 9a of feed conveyor system 9 at irregular time intervals.

The feed conveyor system 9 is comprised of three sections 9a, 9b and 9c arranged in series, the adjacent ends of which are slightly overlapping. These conveyors are represented as being endless chains which pass around sprockets 7 at their driven ends. The sprockets 7 at the forward end of each chain are drivingly mounted on transverse shafts 8, 8', 8" and are driven from motors 22, 23 and 24, through drive chains 28, 27, and 67, respectively, which pass around sprockets 28', 27' and 67' mounted on the ends of shafts 8, 8' and 8" respectively. The other ends of said chains pass around idler sprockets 52, 52' and 52" mounted loosely on shafts 8', 8" and 8"', respectively.

In order to compensate for the irregularity of the time intervals of delivery of blocks by the block machine the feeding conveyor designated generally by numeral 9, or portions thereof, and the curing trolley 2 must have their running periods, or speeds, or both, so regulated that the blocks will be in proper position to be picked up by the hangers 10 of the trolley as the said hangers pass the pick up stations G and H located at the position indicated in general by letter J.

For the purpose of controlling and coordinating the running of the feed conveyor system and the trolley transport a set of limit switches are provided along the paths taken by the blocks in the course of their feeding and treatment transport. These limit switches are represented diagrammatically since their actual detailed construction is of no importance with respect to the present invention except as is hereinafter pointed out. These switches are indicated in the drawings by numerals 14, 15, 16, 17, 18, 19, 20 and 21, respectively.

The transport trolley is driven by motor 25, and discharge conveyor by motor 26, FIG. 7.

The synchronized, coordinated operation of the units of the feed conveyor system and the trolley driving motor under control of their limit switches and relays will be described later after reference is made to various features of the treatment trolley and its hangers which actually carry the blocks situated on their pallets.

Treatment trolley 1, as previously stated is formed to pass throughout a closed path represented diagrammatically by numeral 2. It is customary for such a path of the trolley to extend through a treatment zone in the form of an elongated building sometimes referred to as a tunnel in which conditions of heat and moisture are maintained suitable to exert a curing effect on the freshly formed blocks. The time during which the blocks are subjected to such curing is rather extensive and therefore the length of tunnel correspondingly long and expensive to manufacture or build and to maintain. In order to obtain the greatest possible output from the curing effected in the curing tunnel, the tunnel should continuously contain the greatest possible number of blocks, and to accomplish this the general or average speed of the trolley should be as low as possible while still being able to receive from the block machine by way of the feeding conveyor the entire maximum output of the block machine.

In FIG. 8 a small section of the trolley mechanism is represented as comprising two vertically spaced sets of rails 29, spaced apart laterally in pairs and between which a set of guide rollers 30 are located for lateral guidance. Carriage 31 also has a further set of rollers 32 rotatably mounted thereon and rolling on rails 34 which carry the load of the carriage and of a hanger 10 depending therefrom. The details of the hanger 10 are adapted especially for the present purpose and some of the details thereof will therefore be pointed out herein. In FIG. 8 the ranger 10 is shown as depending from a part 36 of carriage 31, which part 36 is provided with an opening 37 into which a hooked upper end portion 39 of depending rod 40 extends. To the lower end portion of rod 40 a frame 41 is connected at 42 at a central upper part thereof. The frame 41 comprises a transversely extending beam 44, having at its spaced ends downwardly extending elongated channels 45 and 46 respectively. To these channels 45 and 46 are connected finger-spacing bars 47 having at their outer ends fingers 49 and 50 extending inwardly toward each other at vertically intermediate positions and also at the lower end portions thereof. Finger spacing bars 47 may be connected to channels 45, 46 in any suitable way, but for the purposes of the present illustration the channels are represented in FIGS. 11 and 12 as having transversely spaced pairs of holes 48 through which extend the bars 47, the said bars being suitably bent to pass through said holes.

The two upper sets of fingers carried by the opposite channels 45, 46, constitute a carrier for a pallet containing one, or preferably, more blocks, and the lower set of fingers also comprise a carrier for a further pallet containing one or more blocks.

The adjacent ends of fingers 49, 50 of opposite channels are sufficiently spaced laterally from each other as to allow the fingers to pass by the sides of the feeding and discharge conveyors 9, and 96, respectively, but are close enough together that said fingers can engage under the ends of pallets arranged on the feeding conveyor, as the hangers pass upwardly past the feeding conveyor.

In course of operation when a pallet containing a block or blocks passes from the block-making machine 6, onto the first section 9a of feed conveyor 9, at approximately the position indicated by letter A, said pallet will move forward on the conveyor and, approximately at position B, FIG. 5, comes into contact with the elongated lever 14' of a normally open limit switch 14 and, thus, closes said limit switch and holds it closed while the pallet travels the full length of lever 14' which is approximately the full distance from position A, where it was initially located when ejected from the block-making machine to station D, FIG. 2. As soon as the pallet clears lever 14' limit switch 14 opens. Limit switch 14 is connected to cooperate with limit switch 17 to change the speed of trolley 1 as will be explained later.

While located at position or station A the pallet is engaged by an upstanding lug 53 on the chain 56 of the first part 9a of feed conveyor 9 and is carried along to station C, FIG. 5, where the pallet engages the lever 15' of normally closed limit switch 15 and actuates it to open switch 15 and holds it open until the pallet passes beyond said switch lever 15'. Limit switch 15 is so connected as to operate in conjunction with normally closed limit switch 18. The actuating lever 18' of limit switch 18 is depressed and switch 18 is opened when there is a pallet at station F, FIG. 5. When switches 15 and 18 are both opened the contact sets 76 and 77 of switch 60, which supply power to motor 22 from supply conductors 80 and 81, are opened and motor 22 stops, thus, stopping chain 9a until station F is cleared and limit switch 18 closes and again energizes magnet 61 of switch 60 and completes the circuits through contact sets 76 and 77 to motor 22 and again actuating conveyor chain 9a to move a pallet forward and onto chain section 9b at position or station D, FIG. 2.

As the pallet moves ahead from station C to station D and operates the actuating member 16' of normally open limit switch 16 a circuit is closed to magnetic switch 64, FIG. 3, of motor 23 whereupon motor 23 drives, through chain 27 FIGS. 4 and 5, the second portion 9b of conveyor 9 to carry the pallet ahead until it moves off of the actuating member 16' of switch 16 which breaks the circuit to driving motor 23 and stops conveyor section 9b with the rear edge of the pallet just off of actuating member 16' of limit switch 16, with the said pallet in position E, FIG. 5. The pallet then remains in this position or station until the next pallet ejected from the block making machine which will be referred to as the second pallet, moves ahead and depresses the actuating member 16' of limit switch 16, whereupon motor 23 is again driven and both pallets move ahead together in properly spaced relation to the positions or stations E and F respectively. When the second pallet leaves limit switch actuating member 16' driving motor 23 of conveyor section 9b stops and the two pallets remain there at stations E and F.

While situated at position F the first pallet depresses the actuating member 19' of normally open limit switch 19. This switch is connected by way of connection 68, FIG. 3, with normally open limit switch 21 which is located alongside the path of conveyor 1 with its actuating member 21' protruding into the path of one of the rollers 30 of the carriages 31 so as to be engaged and actuated by said rollers as they pass by to close switch 21. This completes the circuit to the magnet 69 of switch 65, which closes four sets of contacts of said switch. Two of said sets of contacts 70 and 71 are connected with current supply conductors 80 and 81, respectively, and with motor 24, thus, supplying current to operate motor 24. Motor 24 is also connected directly with current supply conductor 82 at 83. Another of said sets of contacts 72 closes a circuit from limit switch 21 to limit switch 20. The fourth set of contacts 73 connects limit switch 21 with the electromagnet of relay switch 64 thus, closing its two sets of contacts 74 and 75 and supplying power from supply conductors 80, and 81. Motor 23 is also connected directly to supply conductor 82 at 84.

Trolley transport drive motor 25 is connected directly with supply conductor 82, at 85, and its connection and disconnection with conductors 80 and 81 is controlled by a relay magnet 86 having two double sets of movable contacts 87 and 88. Motor 25 has such windings that it will operate at different speeds depending on which windings are energized. For selectively controlling the speed of operation switch contacts 87 when moved in one direction, upwardly, in FIG. 3, close contacts 90 completing connection between conductor 80 and the said motor at 93 and contacts 88 connect conductor 81 with the motor at 93', but when switch contacts 87 and 88 are moved downwardly, in FIG. 3, the circuit is completed between conductor 80 and point 94 and between conductor 81 at point 94' of motor 25, thus controlling the supply of current to the windings of motor 25 and regulating its speed of drive.

The limit switch 21 is so connected as to cause energization of magnet 69 of switch 65 of motor 24 when limit switch 19 is closed and limit switch 20 is closed. Motor 24 drives conveyor section 9c through chain 67, and, thus, moves both pallets forwardly to pick-up positions or stations G and H, respectively, where the front pallet comes into contact with and operates the actuating lever 20' of normally closed limit switch 20, opening said switch 20, breaking the circuit to motor 24, and stopping the conveyor section 9c with the two pallets in proper position to be picked up by the sets of carrier fingers 49, 50 of carriage hangers 40.

If, however, it should happen, due to delay in operation of the block-making machine 6, there should be no pallet located at station F, limit switch 19, will be open and when switch 21 is closed by a wheel or roller 30 of a carriage 31 the circuit to motor 24 is not closed and conveyor section 9c is not driven.

Assuming now that two pallets have reached the loading station or position J, individually occupying stations G and H, as the trolley 1 with its carriages 31 move around closed path 2, the portion of the trolley above loading station J is moving upwardly at a rather high angle, say approximately 45°, and as the hangers 10 of said carriages move upwardly through the loading station the lower set of carrying forks formed by the lower set of tines or fingers 49, 50 of one carrier hanger will be in approximately horizontal alignment with the upper forks of the next following hanger. The said two sets of forks, therefore, pick up the two pallets located at stations G and H, respectively, approximately simultaneously. The pallets containing the blocks are then passed slowly through the curing room or zone during a considerable period of time, say 4 hours and around to the discharge station K where the blocks are deposited on discharge conveyor 96 which is driven continuously by motor 26 through chain 97 and sprocket 98.

At the farthest extremity of discharge conveyor 96 the pallets are deposited onto a set of rollers 100 rotatably mounted in a frame 101, which is pivoted at one end in a supporting frame 102, at 103 to swing about a horizontal line, and is normally held in approximately horizontal or slightly declined position in extension of conveyor 96. The frame 101 is provided with a counter weight 105, FIG. 1, mounted on the opposite side of pivot 103 from the greater part of roller frame 101. The relative weights and positions of counter weight 105 and frame 101 are such that normally the frame is held in position to receive pallets from conveyor 96, but when the rollers 100 are supporting one or more pallets the counter weight 105 is overbalanced, so that, when released, frame 101 will swing downwardly about pivot 103 into alignment with a roller chute or conveyor 106 located beneath conveyor 96. Conveyor 106 is arranged to deposit pallets carried thereby onto an endless conveyor 108, FIG. 2, which returns the pallets to the block making machine 6 for reuse. The conveyor 108 is driven continuously by any suitable means such as an electric motor, not shown.

When the pallets containing the curred blocks pass from conveyor 96 onto the rollers 100 of roller frame 101 this frame is prevented from pivoting downwardly by latch 109 having a hooked end 110 projecting over a portion of frame 101 in rear of pivot 103, preventing it from swinging upwardly. Latch 109 is pivoted to supporting frame 111 at 112, FIG. 7, and is provided with a forwardly projecting counter weight 114 which gives it the tendency to remain in its position of engagement with frame 101. Also the upper front surface of hook 110 is curved downwardly so that when frame 101 moves to its upper position it acts against said curved surface to press latch 110 to the left until it reaches a position where the hook can engage over the extending end portion of frame 101. When one or more pallets containing blocks are deposited on rollers 100, an operator in charge of the discharge operation removes the blocks from the pallets, and then steps upon a treadle 115 secured on latch 109 which swings the latch away from frame 101 allowing said frame to swing downwardly clockwise, as viewed in FIGS. 1 and 7, which causes said pallets to move along the rollers 100, and on to roller chute 106, whereupon frame 101 returns to its upper position under the influence of counter-weight 105 and is automatically latched in said position by latch 110.

It will be osberved that in operation the speed of the discharge conveyor 96 is constant and sufficient to accommodate the maximum rate of delivery of the block-loaded pallets deposited thereon by the trolley 1. The travel of the trolley and the parts of the feed conveyor, however, are all under the control of sets of limit switches 14–21 inclusive and the electromagnetically operated switches 60, 64, 65, and 86.

Assuming, now the apparatus is being put in operation with no pallets on the trolley hangers and none on the feed conveyor sections, the trolley will operate at low speed because the position of relay magnet 86 is such that the switches controlled thereby supply current to the low-speed drive means of motor 25. Now when a first pallet is deposited on conveyor section 9a, it will be carried to the left since this section will be driven by its motor 22, since electromagnet 61 will be energized and switches 76, 77, closed since, the supply of current to electromagnet 61 is under the control of limit switches 15 and 18 both of which are normally closed. As the first pallet moves to the left it engages and operates lever 14' of limit switch 14 closing said switch which closes a circuit to, normally open limit switch 17. Limit switch 17 is not closed at this time as there is no pallet at the proper position to operate its operating lever 17' which extends from switch 17 to the left along the path to be followed by the pallets to a position beneath station H from which the foremost pallet is picked up by the trolley hangers 10.

When the said first pallet reaches limit switch 15, which is normally closed, switch 15 is opened but the supply of current to electromagnet 61 is not entirely shut off since it will continue to be supplied through limit switch 18, which is normally closed, and therefore motor 22 and conveyor section 9a will continue to run. The first pallet will then continue to move until it leaves conveyor section 9a and is deposited on conveyor section 9b at station D at which time it will depress actuating member 16' of normally open limit switch 16 closing the circuit through the actuating electromagnet 64 of switches 74, 75 and thus supplying operating current to electric motor 23 which drives conveyor section 9b through chain 27. The first pallet is therefore caused to continue its progress to the left until it clears operating member 16' and limit switch 16 opens, shutting off the operating current to motor 23 and causing conveyor section 9b to stop with the rear edge of the first pallet just beyond operating member 16', in the position indicated by letter E, FIG. 5. The first pallet remains in this position E until a second pallet deposited on conveyor section 9a at position A has progressed, in a manner similar to that just described in connection with the first pallet, to a position where it depresses actuating member 16' of limit switch 16, whereupon motor 23 is again caused to run and both pallets are moved further to the left until the second pallet has just cleared switch operator 16', when motor 23 stops and the first and second pallets then occupy the position indicated by letters F and E respectively, FIG. 5.

The further progress of the first and second pallets then becomes dependent on other controls. It will be observed that the first pallet, in position F, lies above and depresses actuating lever 17' of limit switch 17, which is normally open, and holds said switch 17 closed, and due to the length of lever 17' switch 17 is held closed by the two pallets until they have progressed to their final positions H and G on the feed conveyor system and been picked up by the hangers 10 of the trolley 1.

When the third pallet delivered to conveyor section 9a by the block making machine has progressed to station C, FIG. 5, it opens, normally closed switch 15, breaking the circuit through said switch to electromagnet 61. If, at the same time limit switch 18 is open as a result of a pallet being present at station F the circuit through switch 18 to electromagnet 61 will also be broken and contacts 76, 77 will open, stopping motor 22 and conveyor section 9a, causing pallet No. 3 to remain at station C until pallet No. 2 has passed limit switch 18, allowing it to close and complete its circuit to electromagnet 61 which again closes contacts 76, 77 supplying current to drive motor 22 and conveyor section 9a.

The presence of a pallet at station F depresses the actuating member 19' of limit switch 19 closing said switch and closing a circuit to limit switch 21 located alongside the trolley system and also to normally closed limit switch 20 located at the after end of conveyor section 9c, with its actuating member 20' in position to be engaged by a pallet reaching station H. Under these conditions conveyor section 9c is not driven because the circuit which includes its controlling electromagnet 69 is open at limit switch 21. When, the next roller 30 of a carrier 10 on trolley 1 engages the actuating member 21' of limit switch 21 and closes said switch this completes the closing of the circuit to electromagnet 69, whereupon switch 65 is closed supplying current to drive motor 24 which drives conveyor section 9c. The closing of switch 65 also completes a circuit through contact pairs 73 to the magnet of 64 which closes contact pairs 74 and 75 supplying current to drive motor 23 which drives conveyor section 9b. The three conveyor sections, under these conditions are in operation, and remain so until the first pallet engages limit switch actuating arm 20' opening switch 20 interrupting the circuit through magnet 69 and causing switch 65 to open and conveyor sections 9b and 9c to stop. Section 9a continues to run because of the circuit to magnet 61 through normally closed switch 15.

It will be observed that the actuating magnet 86 which controls the positions of switch elements 87 and 88 is under the control of two normally open limit switches 14 and 17 and that whenever either of these switches is open the switch elements are in position to drive trolley motor 25 at the slow rate of speed. When both of these switches 14 and 17 are closed the circuit to magnet 86 is closed and switch elements 87 and 88 move to the opposite position to supply current to motor 25 in such a way as to drive it at its fast speed. This will occur only when pallets are located at stations E and F with the pallet at F depressing actuating member 17', closing switch 17, and another pallet is in position to depress elongated actuating member 14' of switch 14. Thus, during the period when conveyor section 9c is carrying two pallets from stations E and F, to stations G and H trolley 1 is driven at its fast speed. As soon as the leading pallet engages switch operator arm 20' the circuit through limit switch 20 to magnet 69, through contacts 72 and 73, is broken and said switch moves to position to interrupt the drive of motor 23 and 24 and conveyor section 9b and 9c with pallets located at stations G and H in position to be picked up by a carriage on trolley 1.

It is thus apparent that the operation of the conveyor sections 9a, 9b, and 9c are dependent on the presence and location of the pallet being handled thereby and the rate of speed of trolley 1 depends on whether the conveyor section 9c is provided with a pair of pallets for delivery to the trolley and whether at least one further pallet is being transported by conveyor section 9a in contact with switch arm 14'.

The system therefore works with great efficiency. The trolley operates only fast enough to receive all of the pallets the feed conveyor has available for delivery thereto. Whenever for any reason there is any delay in the supply of block-containing pallets to the feed conveyor from the block machine 6 the trolley will operate only fast enough to receive whatever pallets are available. The time required for transport of the blocks through the curing zone or tunnel is therefore longer than would be the case if the trolley continuously operated at its fast rate of speed. This enables the use of a very considerable shorter tunnel and trolley and provides great saving in the cost of construction and operation.

I claim:

1. An article transport apparatus and feeding system and drive-control system for said apparatus and feeding system, comprising a set of conveyors arranged in series for conveying the articles from a position of receipt to a position of delivery to the transport apparatus, separate electric drive means for the individual conveyors of said set and for said transport apparatus, control mechanism for each of said drive means, said control mechanism comprising switches and switch actuating means located in positions to be engaged and operated by articles being fed by said conveyors and by parts of said transport apparatus, the drive control mechanism of said transport apparatus comprising a switch having electric actuating means connected in series with the control switch located adjacent one conveyor of said set and also the switch located adjacent a previous conveyor of said set, said drive control switch of said transport apparatus drive means having means for accelerating the rate of drive of said transport apparatus drive means when said series connected control switches are closed.

2. A system according to claim 1 and in which the control means of the driving means of one of the conveyors of said set is connected in series with a control switch adjacent one of said conveyors of said set, and with a control switch located adjacent said transport system, and operable to connect said driving means of said one conveyor of said set for driving only when both of said control switches connected therewith are closed.

3. A system according to claim 2 and in which a further one of said control switches is located adjacent another of said conveyors of said set in position to be operated when an article reaches a position to be transferred to said transport apparatus to open the connection to the drive control of said other conveyor to stop the drive of said other conveyor with the article in position to be transferred.

4. Apparatus according to claim 1 and in which said set of conveyors includes a conveyor arranged to receive articles to be fed, a conveyor arranged in position to deliver articles to said transport apparatus; and a third conveyor arranged intermediate the conveyor arranged for receiving the articles and the conveyor arranged to deliver said articles to said transport apparatus, and means located adjacent said intermediate conveyor in position to be engaged by an article present on said intermediate conveyor for controlling the drive of said intermediate conveyor to cause it to operate when an article engages said intermediate conveyor control switches and to stop when said article has passed said control switches.

5. Apparatus according to claim 1, and in which said transport apparatus comprises a circulatory trolley provided with spaced carriages having article carriers connected therewith to carry articles from said feeding system through a treatment path, and discharge conveyor means located in position to receive articles from said transport apparatus after transport through said path.

6. Apparatus according to claim 5 and in which said carriages are provided with depending frames having fingers for engaging under said articles to lift and support the articles during their passage through said treatment path.

7. Apparatus according to claim 6, and in which said fingers are arranged on said frames in inwardly projecting sets spaced apart at their inner ends at wider spaces than the width of the delivery conveyor of said feed system and of said discharge conveyor, but closer than the width of the articles transported.

8. Apparatus according to claim 7 and in which said pairs of fingers are arranged in two sets arranged vertically spaced from each other and each set being adapted to carry one of said articles.

9. Apparatus according to claim 8 and in which the path of travel of said carriages when passing the delivery end portion of said set of conveyors is inclined to such degree that the lower set of fingers of one carriage is approximately level with the upper fingers of the next following carriage so that the said two sets of fingers pass upwardly past said conveyor end portion approximately at the same time and each picks up an article from said conveyer end portion at about the same time.

10. Apparatus according to claim 5 and in which said transport apparatus comprises a track, and said carriages are provided with rollers for engaging said track and supporting and guiding said carriages.

11. Apparatus according to claim 10, and in which the parts of said transport apparatus which engage and operate the control device adjacent said transport apparatus are one of the rollers of each of said carriages.

12. Apparatus according to claim 1, and a discharge conveyor arranged to receive treated articles from said transport apparatus and comprising a pair of laterally spaced apart endless bands, drive means for said bands, a frame extending between said bands at the discharge end portion of said discharge conveyor, said frame being provided with a plurality of transverse rotatable rollers, said frame being horizontally pivoted about an axis located beyond the discharge end of said discharge conveyor to swing downwardly, said frame being provided with a counterweight extending beyond said axis to hold said frame in its upper position when not loaded, a latch for retaining said frame in its upper position, and means for releasing said latch to allow said frame to swing downwardly.

13. Apparatus according to claim 12 and in which said latch comprises a horizontally pivoted arm having a hooked upper end for engaging over an end of said roller frame longitudinally beyond the pivot thereof from the downwardly swingable portion of said frame.

14. Apparatus according to claim 13, and a foot treadle on said arm on the opposite side of said latch hook.

15. Apparatus according to claim 14, and a counterweight on said arm on the opposite side from said treadle and the same side as said latch hook.

References Cited in the file of this patent

UNITED STATES PATENTS

| | | |
|---|---|---|
| 1,820,674 | Olson | Aug. 25, 1931 |
| 2,345,355 | Neal | Mar. 28, 1944 |
| 2,493,807 | Frederick | Jan. 10, 1950 |
| 2,700,449 | Gleason et al. | Jan. 25, 1955 |
| 2,866,534 | Carter | Dec. 30, 1958 |